United States Patent
Lee et al.

(10) Patent No.: US 9,723,427 B2
(45) Date of Patent: Aug. 1, 2017

(54) AUDIO PLAYING APPARATUS AND SYSTEM HAVING THE SAME

(71) Applicant: LG ELECTRONICS INC., Seoul (KR)

(72) Inventors: Sangyeop Lee, Seoul (KR); Jooeun Lee, Seoul (KR); Pilyoung Noh, Seoul (KR); Jeanhee Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 120 days.

(21) Appl. No.: 14/508,800

(22) Filed: Oct. 7, 2014

(65) Prior Publication Data

US 2015/0100144 A1 Apr. 9, 2015

(30) Foreign Application Priority Data

Oct. 8, 2013 (KR) .................. 10-2013-0119994

(51) Int. Cl.
| | |
|---|---|
| G06F 17/00 | (2006.01) |
| H04W 4/00 | (2009.01) |
| G11B 27/034 | (2006.01) |
| H04L 29/08 | (2006.01) |
| H04R 1/10 | (2006.01) |

(52) U.S. Cl.
CPC .......... *H04W 4/005* (2013.01); *G11B 27/034* (2013.01); *H04L 67/1095* (2013.01); *H04R 1/1041* (2013.01); *H04R 2420/07* (2013.01)

(58) Field of Classification Search
CPC ........................ H04R 1/1041; H04R 2420/07
See application file for complete search history.

(56) References Cited

U.S. PATENT DOCUMENTS

| | | | |
|---|---|---|---|
| 7,302,468 B2 | 11/2007 | Wijeratne | ............... 709/205 |
| 8,266,115 B1 * | 9/2012 | Park | ............ G06F 17/30864 |
| | | | 707/692 |
| 2004/0093396 A1 * | 5/2004 | Akune | ............... G06F 21/10 |
| | | | 709/219 |
| 2007/0073728 A1 * | 3/2007 | Klein, Jr. | ......... G06F 17/30017 |

(Continued)

FOREIGN PATENT DOCUMENTS

| | | |
|---|---|---|
| JP | 2006-277880 A | 10/2006 |
| JP | 2007-164914 A | 6/2007 |

OTHER PUBLICATIONS

Korean Notice of Allowance dated Oct. 27, 2014 issued in Application No. 10-2013-0119994.

*Primary Examiner* — Thomas Maung
(74) *Attorney, Agent, or Firm* — KED & Associates LLP

(57) ABSTRACT

Disclosed is a system including an audio playing apparatus which includes a memory, a wireless communication unit and a controller. The memory stores first data including at least one music information. The wireless communication unit receives, from an exterior, second data including at least one music information. The controller forms an integrated music list using the first and second data. In the audio playing apparatus, the controller performs a control method including comparing a plurality of music information constituting the first and second data; extracting overlapping music information included in the first and second data; and selecting one music information from the pair of overlapping music information. Thus, a user can more easily form a desired music list.

11 Claims, 18 Drawing Sheets

(56) References Cited

U.S. PATENT DOCUMENTS

| | | | |
|---|---|---|---|
| 2007/0220552 A1* | 9/2007 | Juster | H04N 21/4825 |
| | | | 725/46 |
| 2008/0168365 A1* | 7/2008 | Chaudhri | G06T 11/60 |
| | | | 715/762 |
| 2009/0055510 A1* | 2/2009 | Svendsen | G06F 15/16 |
| | | | 709/217 |
| 2010/0179865 A1* | 7/2010 | Lundqvist | H04L 29/08729 |
| | | | 705/14.4 |
| 2012/0039481 A1* | 2/2012 | McClain | H04R 1/1066 |
| | | | 381/74 |
| 2012/0041954 A1* | 2/2012 | Curtis | H04N 5/783 |
| | | | 707/740 |

* cited by examiner

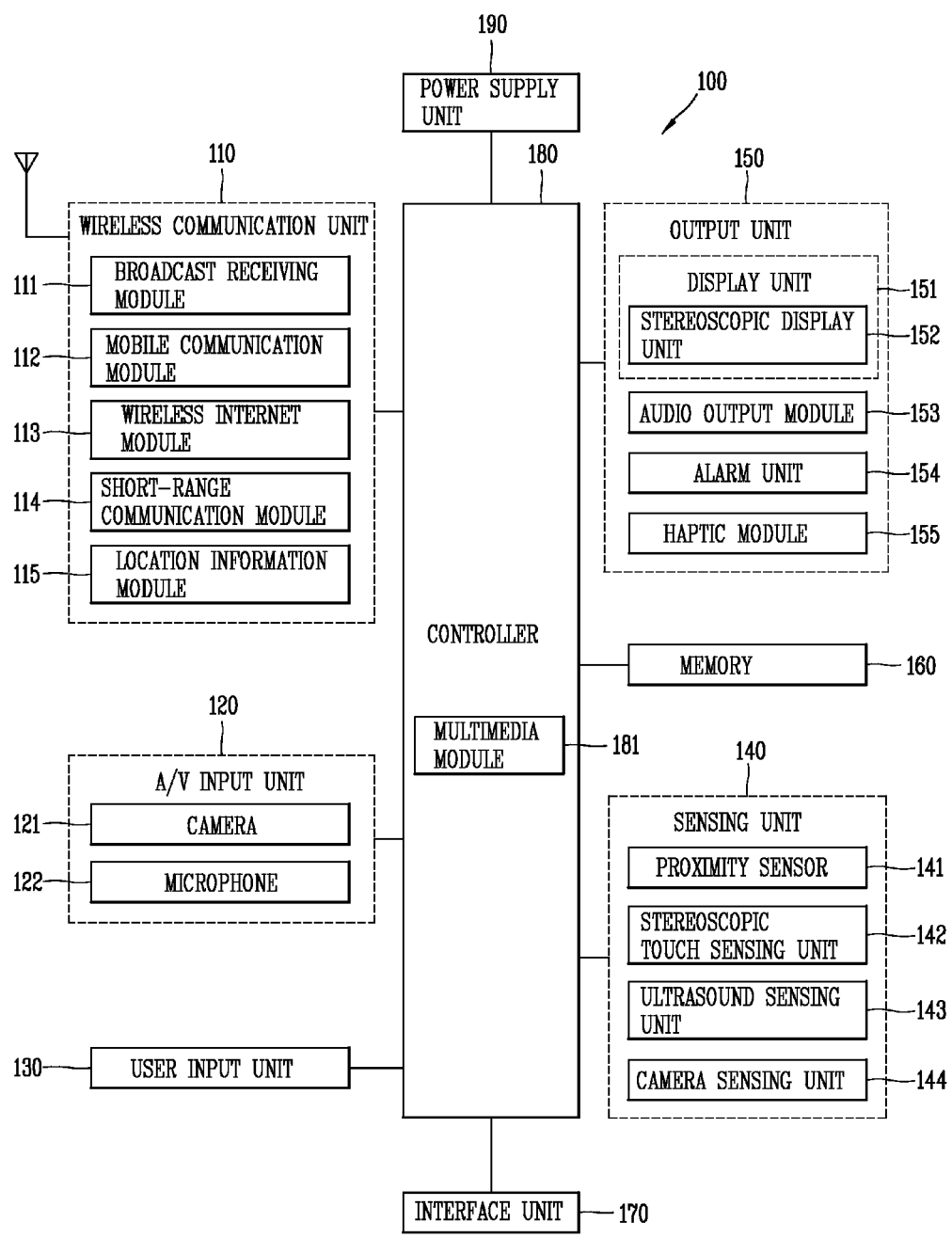

AUDIO PLAYING APPARATUS AND SYSTEM HAVING THE SAME

CROSS-REFERENCE TO RELATED APPLICATIONS

Pursuant to 35 U.S.C. §119(a), this application claims the benefit of earlier filing date and right of priority to Korean Application No. 10-2013-0119994, filed in filed in Republic of Korea on Oct. 8, 2013 the contents of which are incorporated by reference herein in it entirety.

BACKGROUND OF THE INVENTION

1. Field of the Invention

The present disclosure relates to an audio playing system for forming an integrated music list.

2. Description of the Conventional Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device. Various attempts have been made to implement complicated functions in such a multimedia device by means of hardware or software.

Recently, electronic devices have been used as playing devices for outputting media including audio, video and the like. In addition, various kinds of playing devices provide, in real time, audio (or video) information to users using not only data stored in an intrinsic memory but also data stored in a server or another device.

A user may receive data provided from various sources, but there is an inconvenience in that data received from each source should be played through an appropriate application executed by the user, or be individually played from each storage space.

SUMMARY OF THE INVENTION

Therefore, an aspect of the detailed description is to provide a system for which provides an integrated music list including music files provided from various sources.

To achieve these and other advantages and in accordance with the purpose of this specification, as embodied and broadly described herein, an audio playing apparatus includes: a memory configured to store first data including at least one music information; a wireless communication unit configured to receive, from an exterior, second data including at least one music information; and a controller configured to form an integrated music list using the first and second data, wherein the controller performs a control method including: comparing a plurality of music information constituting the first and second data; extracting overlapping music information included in the first and second data; and selecting one music information from the pair of overlapping music information.

In one exemplary embodiment, the controller may select music information stored in the memory from the pair of overlapping music information.

In one exemplary embodiment, the audio playing apparatus may further include a speaker configured to output music based on the integrated music list. When the playing sound quality of a first music in the integrated music list is lower than a predetermined reference sound quality, the controller may search music information matched to the first music in the second data.

In one exemplary embodiment, when music information matched to the first music does not exist in the second data, the controller may extract, from the second data, a similar music including music information similar to the first music.

In one exemplary embodiment, the similar music information may correspond to at least one of the same singer, the same genre, the same album and the same music title as the first music.

In one exemplary embodiment, the controller may control the wireless communication unit to receive subordinate information related to the first music. The controller may control the memory to store the received subordinate information together with the first music.

In one exemplary embodiment, the controller may compare the predetermined reference sound quality with the playing sound quality of music included in the music information constituting the first data.

In one exemplary embodiment, when wireless communication connection to the exterior is limited while a second music included in the second data is being played, the controller may search music information similar to the second music in the first data.

In one exemplary embodiment, when a similar music included in the similar music information is the same music as the second music, the controller may play the similar music from a playing time of the similar music, corresponding to the suspension time of the second music.

In one exemplary embodiment, when a similar music included in the similar music information is different from the second music, the controller may suspend the playing of the second music and play the similar music from the beginning.

In one exemplary embodiment, the audio playing apparatus may further include a display unit configured to output screen information on the integrated music list. The display unit may output a pop-up window including information on that the playing of music being played is limited when the wireless communication connection is limited.

In one exemplary embodiment, the audio playing apparatus may further include a display unit configured to output screen information on the integrated music list. The screen information may include a source image of each music information representing the first or second data.

In one exemplary embodiment, the audio playing apparatus may further include a speaker configured to output music information based on the integrated music list. When the source of the output music information is changed while the music information is being output, the controller may control the display unit to change the source image.

In one exemplary embodiment, the music information constituting the second data may correspond to at least one of streaming music information and music information downloaded from an external device connected to the audio playing apparatus.

In one exemplary embodiment, the first and second data may further include subordinate information related to each music. The controller may control the wireless communication unit to receive additional music information based on the subordinate information. The controller may form music information extracted from the first and second data based on the subordinate information and an additional music list including the extracted music information.

In one exemplary embodiment, the subordinate information may include preference information on each music information stored by a user. The controller may perform a control method including selecting one preference; analyzing music information including the selected preference; searching additional music information similar to the analyzed music information; and forming an additional music list including the additional music information and the extracted music information.

In one exemplary embodiment, the subordinate information may include sentiment classification data with respect to the music. The controller may form an integrated music list configured with music information including specific sentiment classification data according to a user's sentiment selected based on music information that has been played.

In one exemplary embodiment, the audio playing apparatus may further include a speaker configured to output a sound based on a digital signal using the wireless communication unit. The controller may analyze listening music information included in the sound. The controller may form an additional music list by extracting the extracted listening music information from the first and second data.

In one exemplary embodiment, the audio playing apparatus may correspond to a headset including a fixing unit fixed to a user's head and a speaker for outputting sounds.

To achieve these and other advantages and in accordance with the purpose of this specification, as embodied and broadly described herein, a system includes: a service server configured to provide first data including at least one music information; and an audio playing apparatus configured to form an integrated music list using at least one music information, wherein the audio playing apparatus includes: a memory configured to store second data including at least one music information; a wireless communication unit configured to receive the first data; and a controller configured to form an integrated music list using the first and second data, wherein the controller performs a control method including: comparing a plurality of music information constituting the first and second data; extracting overlapping music information included in the first and second data; and selecting one music information from the pair of overlapping music information based on a predetermined reference.

According to the present disclosure, an integrated music list is formed with music information extracted from various sources. The integrated music list selectively includes overlapping music information. Thus, a music list can be provided without any edition of music information, performed by a user.

Further, insufficient music information can be received and supplemented from various sources. When music based on selected music information is not smoothly played, identical and similar music received from another source can be played. Thus, it is possible to provide the user with a playing apparatus with improved playing quality.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings:

FIG. 2A is a block diagram illustrating a mobile terminal according to an exemplary embodiment;

DETAILED DESCRIPTION OF EXEMPLARY EMBODIMENTS

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
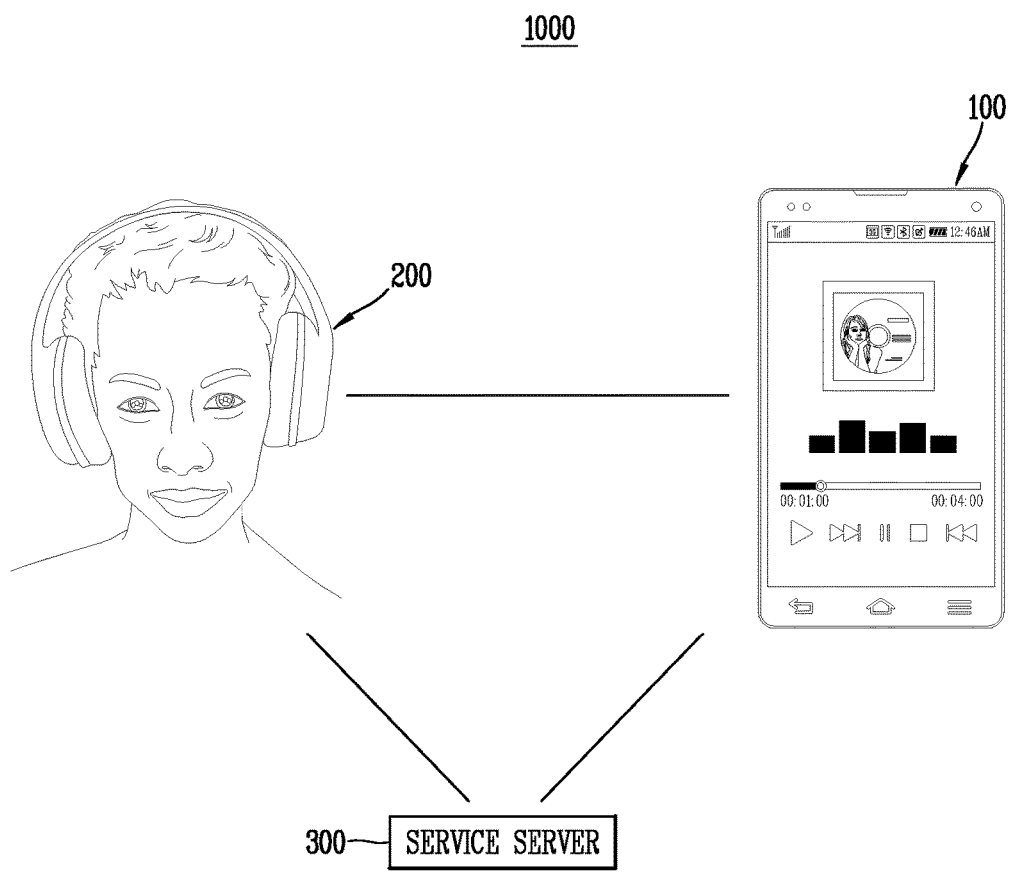
FIG. 1 is a configuration view illustrating a system of the present disclosure.

FIG. 1 is a configuration view for explaining a system of the present invention. The system 1000 of the present invention may include a headset 200 and a mobile terminal 100 as an audio output unit, and further includes a service server 300 for transmitting music information real time. The mobile terminal 100 and the headset 200 are connected to each other by radio or wirelessly, thereby transmitting and receiving music information. The service server 300, the mobile terminal 100 and the headset 200 perform wireless communication. The service server 300 transmits data according to a signal transmitted by the audio output unit. Data stored in the service server 300 may be updated or deleted at preset time intervals.

The service server 300 real time transmits image and voice to the audio output unit. The service server 300 may transmit multimedia of a large capacity in a divided manner (streaming technology). Upon receipt of a signal requesting for content from a user of the audio output unit, the service server 300 streams the content to a computer of the user. According to multimedia streaming, playing is started even if a partial region rather than an entire region of a multimedia file is received, and part of the multimedia can be continuously received during the playing.

FIG. 2A is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module or a wireless fidelity (WiFi) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, a switchable scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2B:
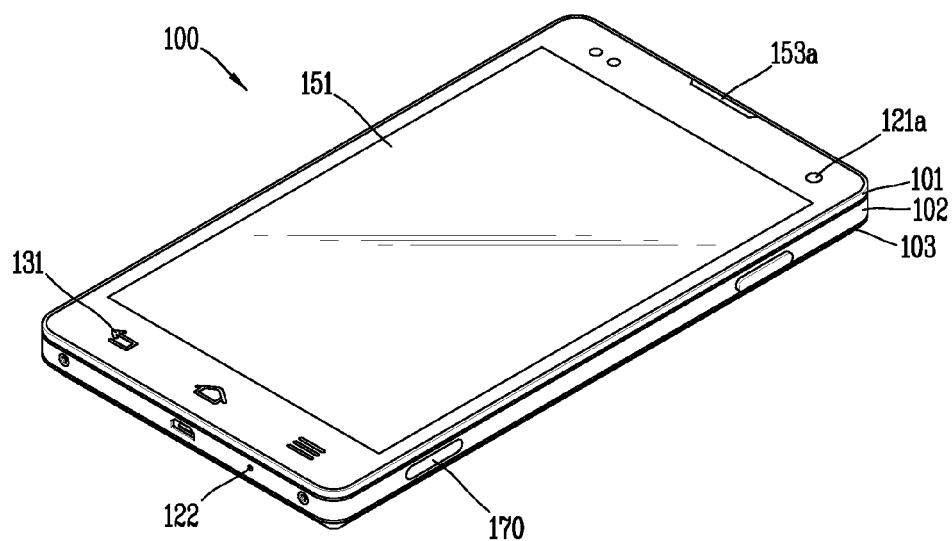
FIG. 2B is a front perspective view illustrating an example of the mobile terminal.

FIG. 2B is a front perspective view of the mobile terminal 100 according to an embodiment of the present invention.

The mobile terminal 100 according to the present disclosure is a bar type mobile terminal. However, the present disclosure is not limited to this, but may be applied to a watch type, a clip type, a glasses type, or a slide type in which two or more bodies are coupled to each other so as to perform a relative motion, a folder type, or a swing type, a swivel type and the like.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102. A battery cover 103 for covering a battery 191 may be detachably mounted to the rear case 102.

Such cases may be formed by injection-molded synthetic resin, or may be formed using a metallic material such as stainless steel (STS) or titanium (Ti).

At the front case 101, may be disposed a display unit 151, a first audio output unit 153a, a first camera 121a, a first user input unit 131, etc. On the side surfaces, may be disposed a microphone 122, an interface unit 170, a second user input unit 132, etc.

The display unit 151 may output information processed in the mobile terminal 100. The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 2C:
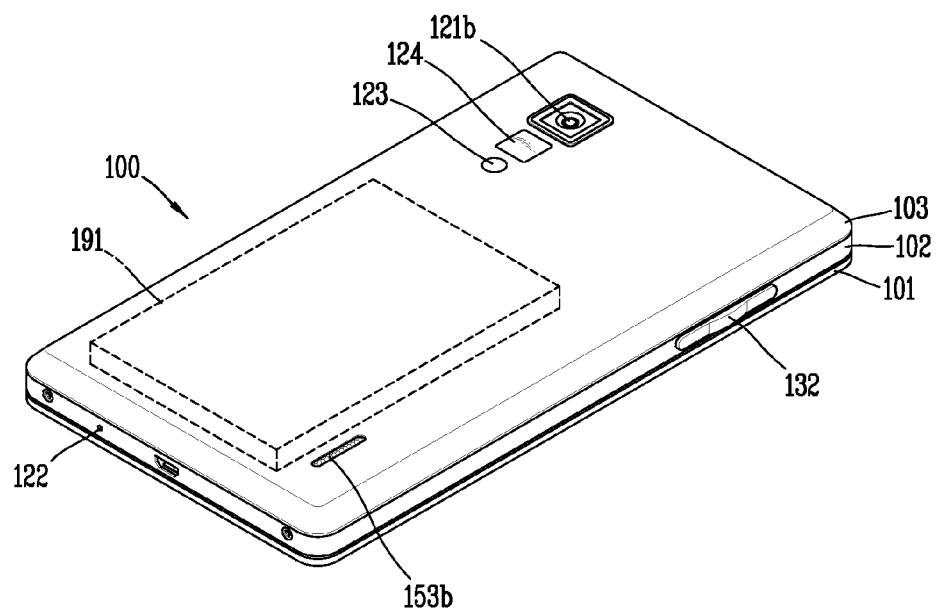
FIG. 2C is a rear perspective view of the mobile terminal shown in FIG. 2B.

FIG. 2C is a rear perspective view illustrating mobile terminal 100 illustrated in FIG. 2B.

Referring to FIG. 2C, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

For convenience, the audio output unit will be hereinafter referred to as the mobile terminal 100. However, the present invention is not limited to this. That is, the audio output unit may correspond to the headset 200 connected to the mobile terminal 100 by radio.

Figure 3:
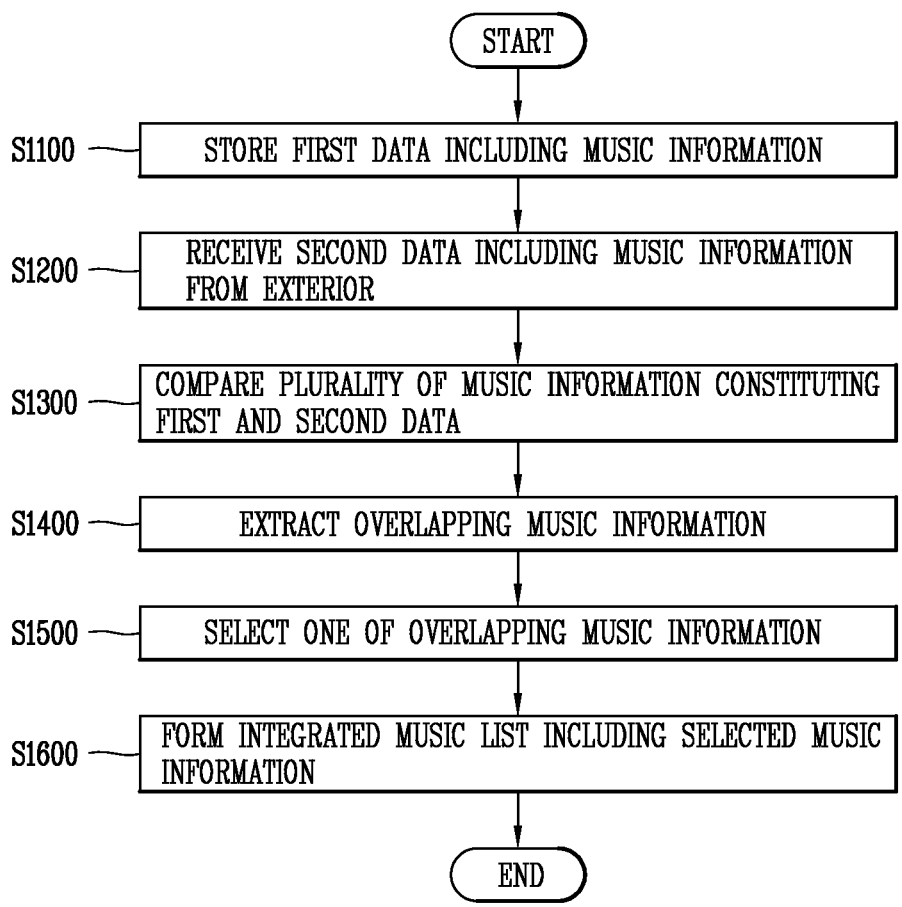
FIG. 3 is a flowchart illustrating the system of the present disclosure.

FIG. 3 is a flowchart illustrating the system of the present disclosure. The memory 160 stores first data including music information (S1100). The first data may correspond to an aggregate of a plurality of music information. Here, the music information includes a music playing file played through the speaker 153. In addition, the music information includes visual information related to music to be output to the display unit 151 while the music playing file is being played. For example, the visual information may include the title of the music, the name of a singer, the name of an album in which the music is recorded, an image, and the like.

The first data are stored in the memory 160 by a user or a provider of the mobile terminal. The first data can be played and output without communication with a specific server. The music information included in the first data may include music information formed with various playing sound qualities.

The controller 180 receives second data including the music information from an exterior (S1200). Here, the exterior may correspond to the service server 300 or an external device. The controller 180 may request transmission of music information for playing music from the service server 300, and receive music information for playing, in real time, music using wireless communication. The controller 180 may output the music information on the display unit 151 so that music can be received in real time based on a user's selection.

The controller 180 compares a plurality of music information constituting the first and second data (S1300). The first and second data may include the substantially same music information. For example, the first and second data may include the substantially same playing file. The plurality of music information including the substantially same playing file may include different titles, and the like. The playing file may be formed with different playing sound qualities. The controller 180 decides the music information including the substantially same playing file as overlapping music information.

The controller 180 extracts the overlapping music information (S1400), and selects one of the overlapping music information (S1500). That is, the controller 180 selects one of the two substantially same music information respectively included in the first and second data, based on a predetermined reference. The predetermined reference may preferentially select music information included in the first or second data, select music information including predetermined subordinate information (e.g., information on the words of a song, or the like), or select music information having a predetermined playing quality.

The controller 180 forms an integrated music list including the selected music information (S1600). The integrated music list includes one music information selected from the overlapping music information, and music information not overlapped with each other. The number of music information included in the integrated music list is not limited thereto.

The integrated music list is listed based on a predetermined list reference. The predetermined list reference may correspond to an order of song titles, an order of singers' names, a recently stored order, etc.

The controller 180 controls the sound output unit 153 to output music using the music information included in the integrated music list. Hereinafter, a control method for forming the integrated music information will be described in detail.

Figure 4A:
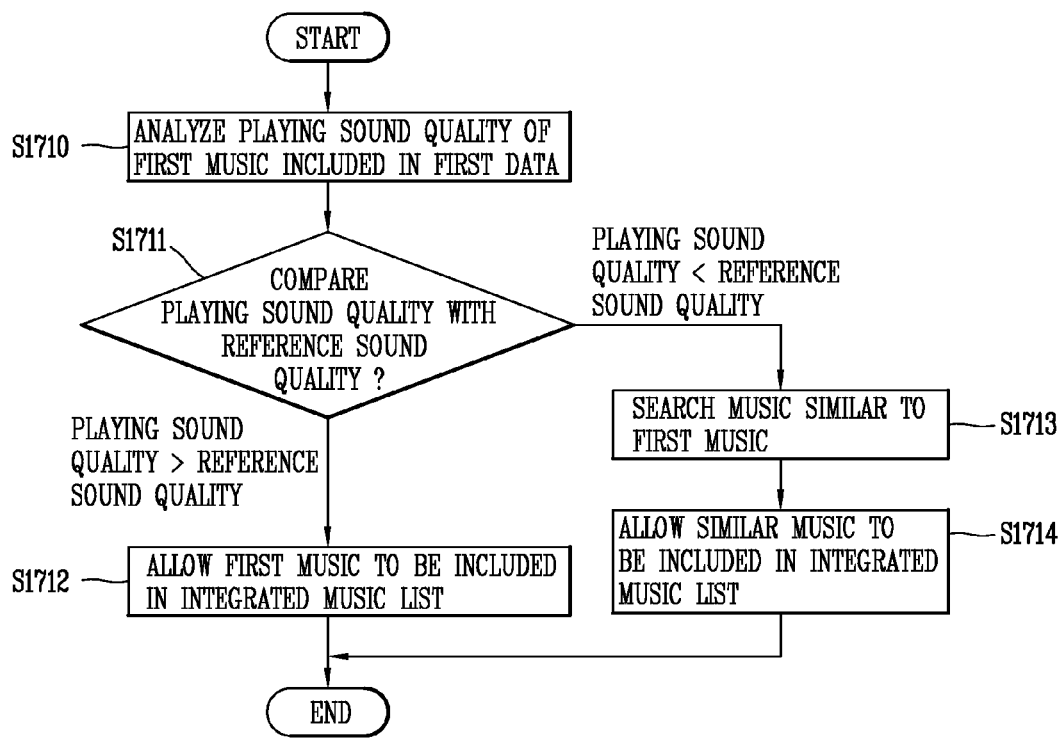
FIGS. 4A and 4B are flowcharts illustrating a control method for selecting one of overlapping music information.
Figure 4B:
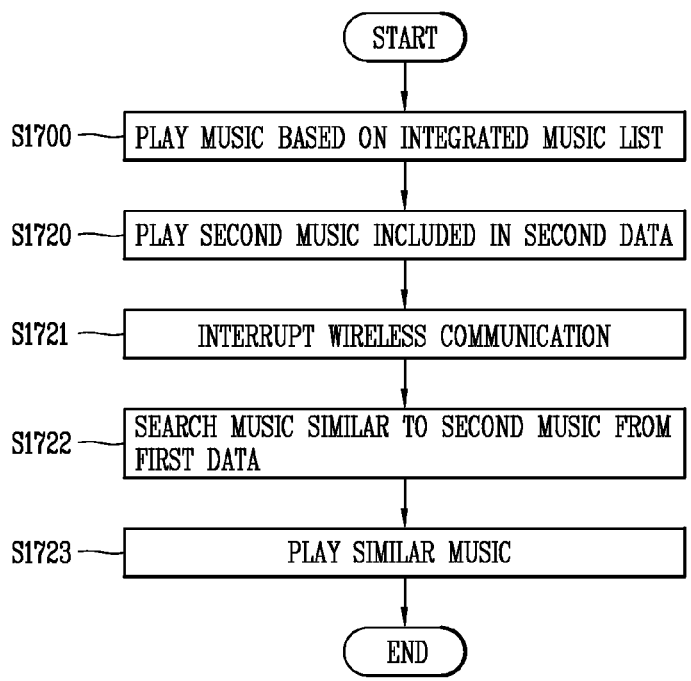
Figure 4C:
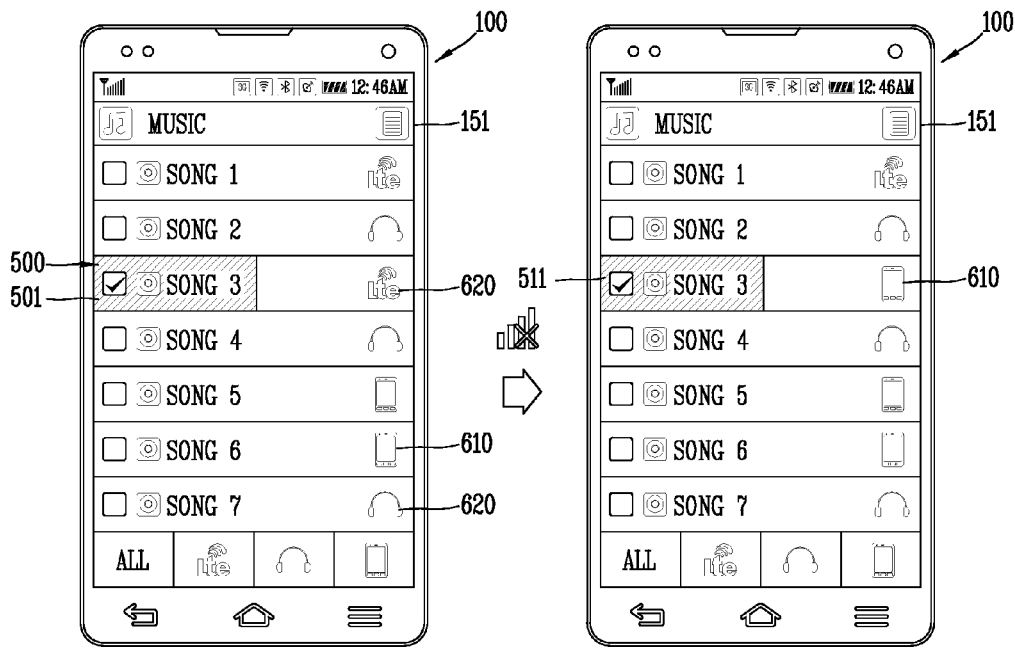
FIGS. 4C to 4E are conceptual views illustrating the control method of FIGS. 4A and 4B.
Figure 4D:
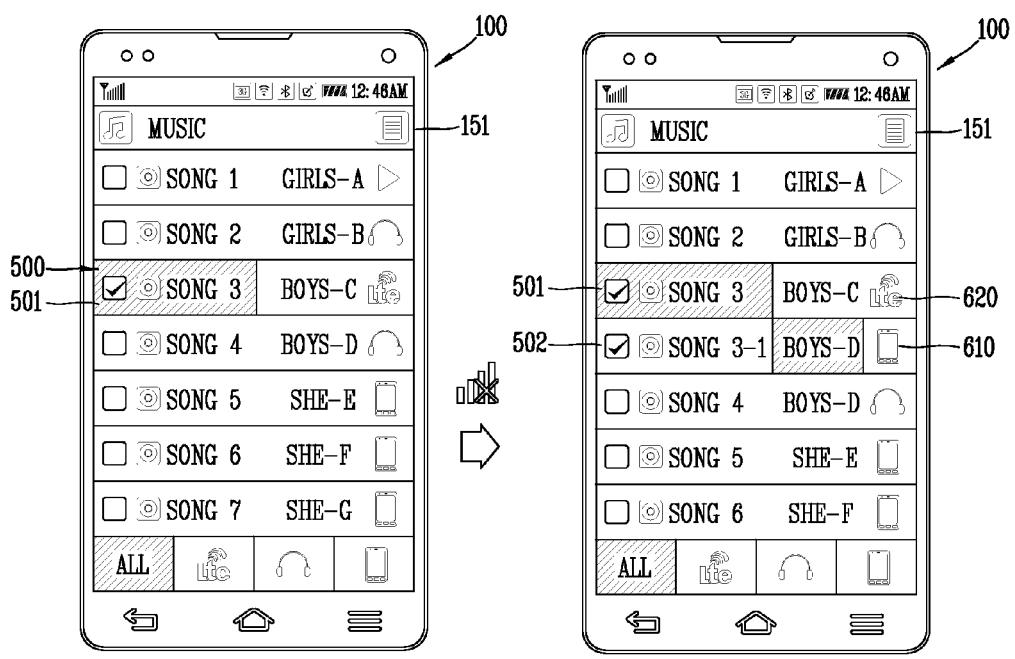
Figure 4E:
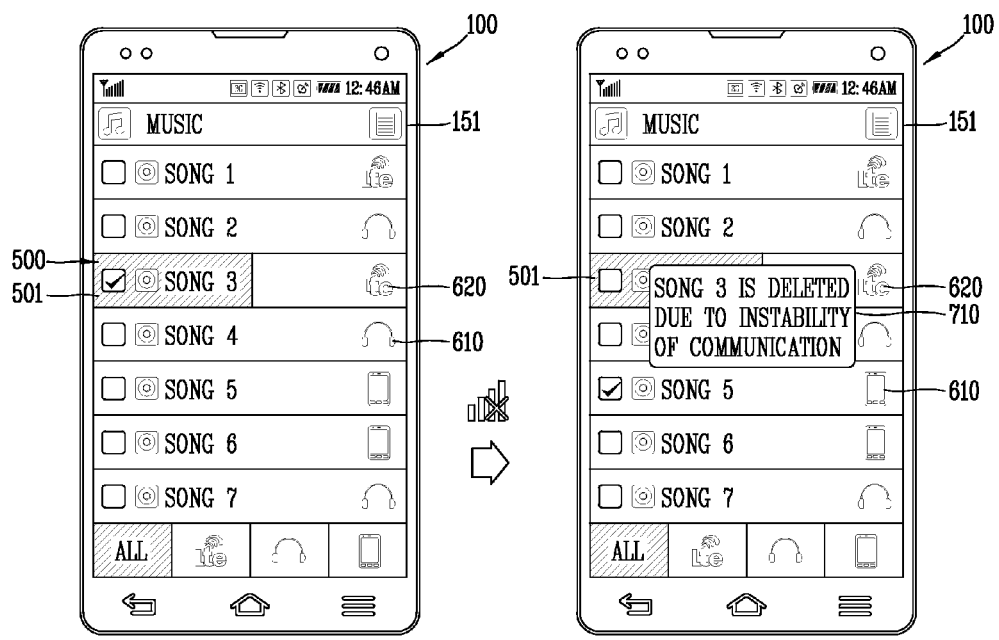

FIGS. 4A and 4B are flowcharts illustrating a control method for selecting one of overlapping music information. FIGS. 4C to 4E are conceptual views illustrating the control method of FIGS. 4A and 4B.

The control method will be described with reference to FIG. 4A. The controller 180 analyzes the playing sound quality of a first music included in the first data (S1710). When overlapping music information are included in the first and second data, the controller 180 allows the first music included in the first data to be included in the integrated music list. That is, the controller 180 preferentially selects music information included in a storage space inside the audio playing apparatus.

The controller 180 compares the analyzed playing sound quality with a predetermined reference sound quality (S1711). The reference sound quality may be previously set by the sound output quality of the audio playing apparatus, the user's preferential playing sound quality, etc.

When the playing sound quality is better than the reference sound quality, the controller 180 allows the first music to be included in the integrated music list (S1712).

Meanwhile, when the playing sound quality of the first music is lower than the reference sound quality, the controller 180 searches a music similar to the first music (S1713). For example, the controller 180 searches a similar music substantially identical to the first music among the music information included in the second data. Here, the substantially identical music means a music including the same playing information. Generally, the playing sound quality of music provided in a streaming manner may be formed with a sound quality further improved than the playing sound quality of the first music stored in the memory 140.

That is, the controller 180 forms the integrated music list by allowing the first data, i.e., the music information stored in the memory 160 to be included in the integrated music list. The controller 180 searches, from the second data, music information including a playing sound quality lower than the reference sound quality among the music information stored in the memory 160. Accordingly, the controller 180 can form an integrated music list including music information having a playing sound quality higher than a predetermined playing sound quality. However, the controller 180 may recommend music information to be included in the integrated music list based on the sound quality. The display unit 151 may recommend music information with a better sound quality while outputting substantially identical overlapping music information that receives a user's touch input. For example, the display unit 151 may output an indicator (e.g., an icon, etc.) indicating music information with a better sound quality while outputting overlapping music information.

In this case, the user identifies overlapping music information before the integrated music list is formed. When there occurs a difference between sound qualities included in the music information, the user may also receive information related to the sound qualities.

Meanwhile, the control method may be formed while the sound output unit 153 is outputting music according to the integrated music list. The integrated music list includes music information included in the first data among the overlapping music information included in both the first and second data. The controller 180 may compare the playing sound quality of the first music included in the integrated music list with the reference sound quality while one music is being played. The controller 180 may compare the playing sound quality with the reference sound quality just before the first music is played or while the first music is being played.

For example, when it is decided that the playing sound quality of the first music is lower than the reference sound quality while the first music is being played, the controller 180 may search, from the second data, a similar music decided to be a music substantially identical to the first music. The controller 180 may control the sound output unit 153 to subsequently output the similar music instead of the first music from the second data.

A control method for forming an integrated music list when wireless communication is interrupted will be described with reference to FIG. 4B. The controller 180 plays music based on the integrated music list (S1700).

While a second music included in the second data is being played (S1720), the wireless communication may be interrupted (S1721). The second music is received in real time from the service server. Therefore, if the wireless communication is interrupted, the playing of the second music may be interrupted.

If the wireless communication is interrupted, the controller 180 searches a music similar to the second music from the first data (S1722).

Although the wireless communication is interrupted, a music file to be played for a predetermined time is received by the streaming manner. Thus, if the similar music searched from the first data is subsequently played (S1723), the user can continuously receive music regardless of interruption of the wireless communication.

A method of playing music when the wireless communication is interrupted will be described in detail with reference to FIGS. 4C to 4E. Referring to FIG. 4C, the controller 180 outputs an integrated music list 500 on the display unit 151. The integrated music list 500 output on the display unit 151 may sequentially a plurality of music information constituting the first and second data. For example, the display unit 151 may display the title of music included in the integrated music list, a singer of the music, a playing time, and the like. The display 151 outputs a source image representing a source of the music information. Here, the source means the first and second data, and corresponds to the audio playing apparatuses 100 and 200 and the service server 300, which are included in the system of the present disclosure.

For example, in the case of the mobile terminal including the display unit 151 and the speaker, the first data may be stored in the memory 160 of the mobile terminal 100, and the second data may be stored in any one of the headset 200 that is an external apparatus and the service server 300.

Accordingly, the controller 180 controls the display unit 151 to output, to each music information, a first source image (mobile terminal, 610) corresponding to the source of the first data or a second source image (headset or service server 620) corresponding to the source of the second data.

The controller 180 may control the display unit 151 to display currently played music information among the sequentially displayed music information. For example, as shown in this figure, the display unit 151 may display playing information formed in the shape of a bar in an area in which characters corresponding to the music information are output. That is, the controller 180 controls the display unit 151 to display the bar so that the length of the bar increases as the time to play the music of the music information elapses.

As shown in this figure, a second music (song 3) 501 extracted from the service server 300, i.e., the second data receives, in real time, playing information from the service server 300 connected by wireless to the mobile terminal 100. The display unit 151 simultaneously outputs information on the second music 510 and the second source image 620 representing the second data (service server).

Meanwhile, when the wireless communication is interrupted while the second music 501 extracted from the second data is being played, the controller 180 searches, from the memory 160, a similar music substantially identical to the second music 501. The similar music corresponds to a music having playing information substantially identical to that of the second music 501. The similar music includes a music substantially identical to the second music 501 even though the playing sound quality and subordinate information of the similar music are different from those of the second music 501. The controller 180 may search the similar music based on whether sound information of the similar music, output through the speaker, is identical to that of the second music 501.

When a similar music 511 is extracted from the memory 160, the controller 180 controls the sound output unit 153 to output the second music based on the similar music 511. Continuous music playing is possible by means of the similar music 511 searched together with the playing information of the second music received until before the wireless communication is interrupted. That is, the similar music is played from a playing time of the similar music, corresponding to the interruption time of the second music 501.

The controller 180 controls the display unit 151 to switch the second source image 620 to the first source image 610. The display unit 151 outputs the bar so that the length of the bar gradually increases while the playing is being continued based on the similar music.

Accordingly, when a music substantially identical to a currently played music is stored in the memory even though the wireless communication is interrupted while the currently played music is being received using the wireless communication, the substantially identical music can be played without interruption.

Particularly, when music information included in the second data among the music information included in the first and second data is included in the integrated music list, the same music stored in the memory 160 inside the audio playing apparatus can be subsequently played.

A control method for subsequently outputting a similar music when music information corresponding to the same music does not stored in the first data will be described with reference to FIG. 4D. FIG. 4D illustrates a state in which the wireless communication is interrupted while the second music 501 is being output. If the wireless communication is interrupted, the controller 180 searches, from the first data, a music substantially identical to the second music 501.

When the music substantially identical to the second music 501 is not searched from the first data, the controller 180 extracts a similar music recognized to have similarity to the second music 501, and controls the sound output unit 153 to subsequently output the similar music 502.

Here, the similar music 502 recognized to have the similarity to the second music 501 is a music recognized to have similarity to the second music 501 even though the playing information of the similar music 502 is not substantially identical to that of the second music 501. The similar music 502 may correspond to a music obtained by arranging the second music, a second music sung by another singer, or a second music formed with only tones without the words of a song.

If the similar music 502 is extracted from the first data, the controller 180 plays the similar music 502 subsequently to the second music 501. Accordingly, the user can continuously receive music which is not identical but recognized to have similarity.

Although not shown in this figure, when the similar music is not searched, the controller 180 may extract a relative music having a relationship with the music information of the second music 501. Here, the relationship is defined as that at least one of the other information except music playing information included in the music information is substantially identical to the music information of the second music 501. For example, the similar music may correspond to an album in which the singer of the second music, the title of the second music 501 and the second music 501 are recorded, etc.

The controller 180 may stop outputting the second music 501 and play the relative music, based on the interruption of the wireless communication.

A control method of notifying a change of the integrated music list due to interruption of the wireless communication, will be described with reference to FIG. 4E. If the wireless communication is interrupted, the controller 180 controls the display unit 151 to output a pop-up window 710 including information that currently played music is deleted (or suspended) due to the interruption of the wireless communication.

When a similar music of the second music 501 is not searched, the controller 180 may control the display unit 151 to the pop-up window 710, but the present disclosure is not limited thereto. The controller 180 may also control the display unit 151 to display, in the pop-up window 710, a graphic image for selecting whether the similar music or relative music is searched.

Accordingly, the user can recognize, even through the display unit 151, information that the wireless communication is interrupted and the output of music is finished.

FIGS. 5A to 5E are conceptual views illustrating a control method for forming an additional music list.

Figure 5A:
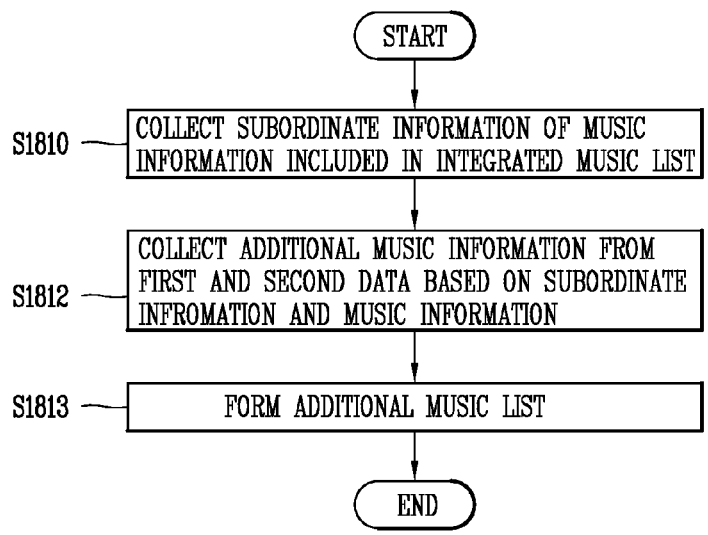
FIGS. 5A to 5E are conceptual views illustrating a control method for forming an additional music list.
Figure 5B:
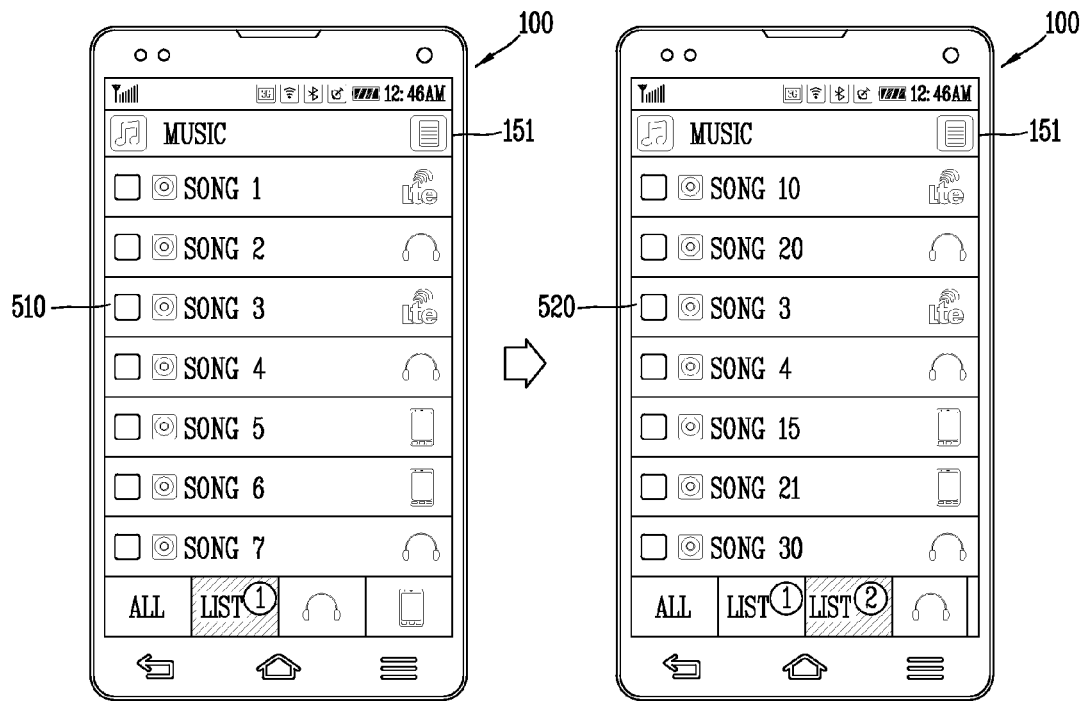

A method for forming a general additional music list will be described with reference to FIGS. 5A and 5B. The controller 180 collects subordinate information of music information included in the integrated music list (S1810). Here, the subordinate information includes various information tagged in the music information. For example, the subordinate information may correspond to the date on which the integrated music list was formed, the number of times of playing where the music information is played by the user, the playing time of the music information, the ranking of the music information, etc.

The controller 180 collects additional music information from the first and second data based on the subordinate information and the music information (S1812), and forms an additional music list 520 including the additional music information (S1813).

For example, when the subordinate information corresponds to the date on which the integrated music list was formed, the controller 180 extracts additional music information which has recently been updated in the second data or newly included in the first data based on the date. The controller 180 forms the additional music list 520 using the extracted additional music information and the music information included in the integrated music list.

Meanwhile, the number of music information included in the additional music list 520 is limited, the controller 180 may exclude, from the additional music list 520, music information which has been first included in the first or second data based on the date.

For example, when the subordinate information corresponds to the number of times of playing, the controller 180 may change the order of music information listed on the display unit 151 based on the number of time of playing.

Figure 5C:
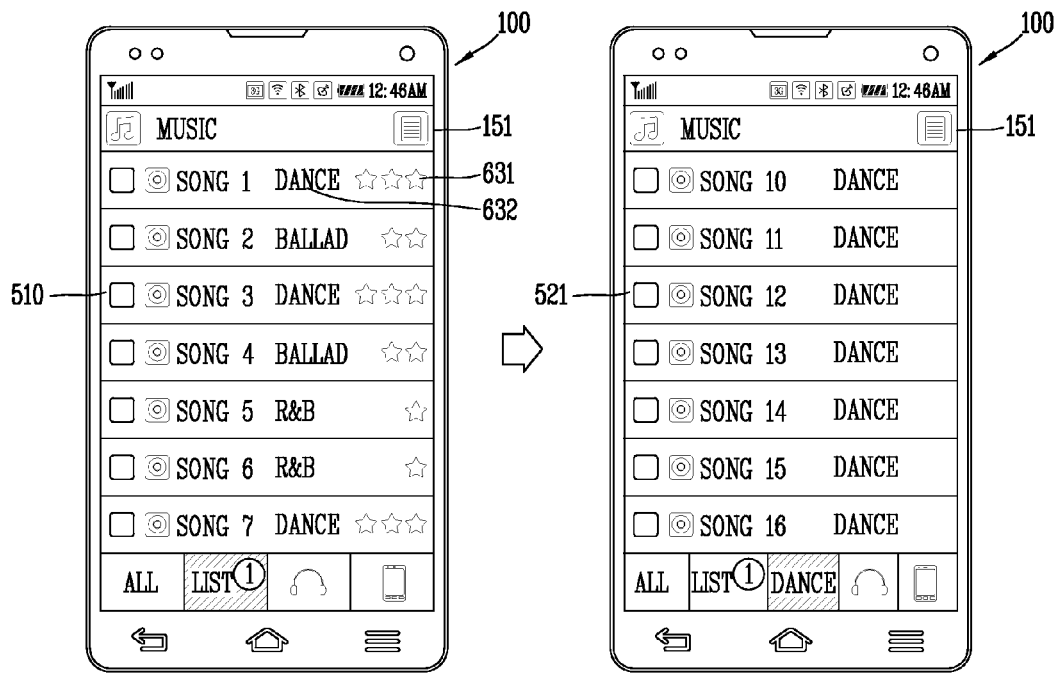

A method for forming an additional music list according to a preference will be described with reference to FIG. 5C. The integrated music list 510 may include a genre 632 (e.g., dance, ballad, R&B, etc.) of music information included in the integrated music list 510 and a preference 631.

The preference may be input by the user, but the present disclosure is not limited thereto. For example, the preference may correspond to a popularity of music provided from the service server 300.

The controller 180 may form an additional music list 521 based on at least one of the preference and the genre. The controller 180 analyzes a genre in which the score of the preference is high. For example, if it is decided that the preference of the dance genre is high, the controller 180 forms the additional music list 521 by extracting music information corresponding to the dance genre. In addition to the music information included in the integrated music list, the controller 180 may extract additional music information of the dance genre from the first and second data and add the extracted additional information to the additional music list.

Meanwhile, the controller 180 may form an additional music list by extracting music information corresponding to that the preference is more than a predetermined reference.

Figure 5D:
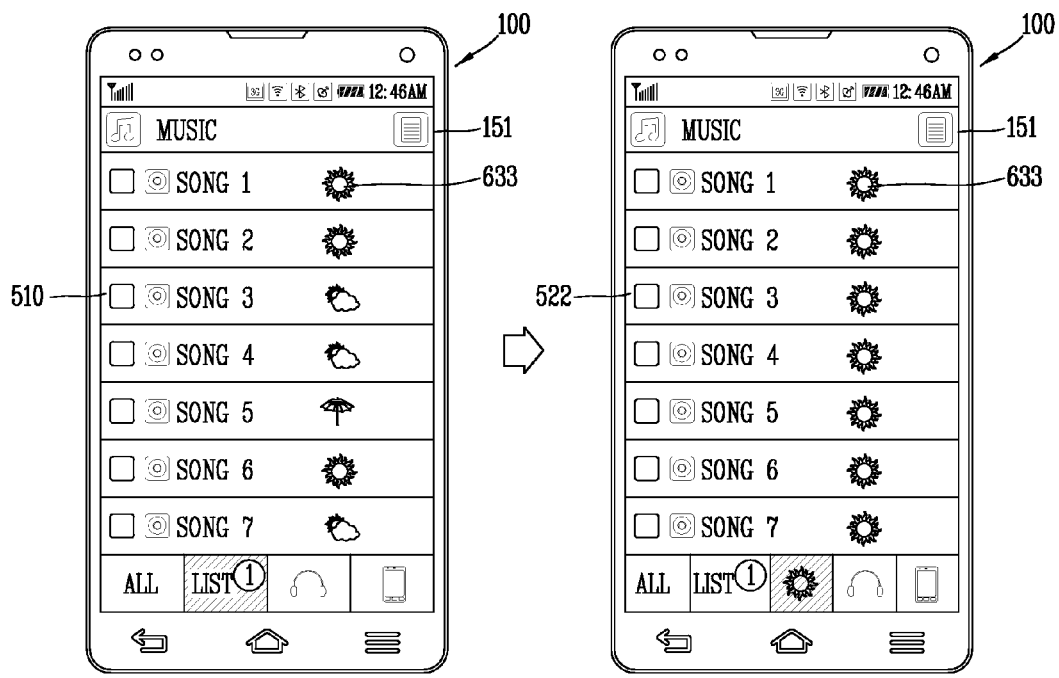

A control method for forming an additional music list using sentiment classification data included in music information will be described with reference to FIG. 5D. The music information may include sentiment classification data corresponding to each music. The sentiment classification data may be received by the service server, or may be set by the user. For example, the sentiment classification data may be formed by a user's sentiment state suitable for listening to the music, a sensation of music classified by an arbitrary reference, and a sentiment state included in the words of a song.

The integrated music list 510 includes sentiment classification data 633 included in the music information. Although the sentiment classification data is displayed as an image representing a weather condition in this figure, the present disclosure is not limited thereto.

The controller 180 may extract music information including specific sentiment classification data from the integrated music list 510, and for an additional music list 522 including the extracted music information. The controller 180 may also extract additional music information including the specific sentiment classification data from the first and second data.

Here, the specific sentiment classification data may be specified by the user, or may be automatically set as the controller 180 predicts the user's sentiment state. The controller 180 may detect a user's sentiment state by analyzing sentiment classification data included in music information that the user has recently played.

Figure 5E:
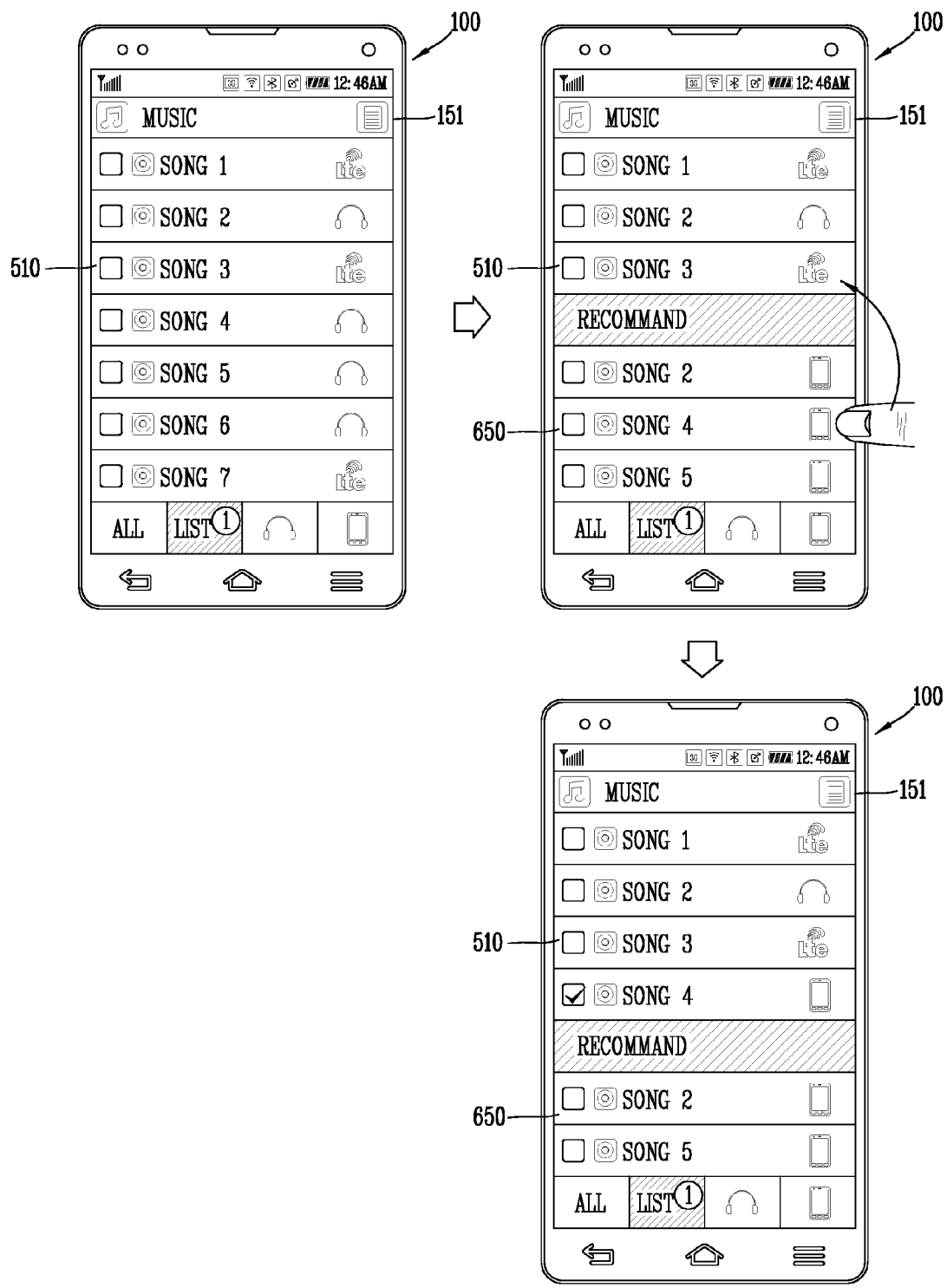

FIG. 5E is a conceptual view illustrating an exemplary embodiment of recommending music information constituting the integrated music list, based on a device or server connected to the mobile terminal. The controller 180 forms an integrated music list 510 by sensing an external device and a server, which are currently being connected to the mobile terminal.

When an external device is additionally connected to the mobile terminal, the controller 180 controls the display unit to output a recommendation music list 650 by comparing music information included in the integrated music list 510 and music information stored in the external device.

The recommendation music list 650 may include music information substantially identical to the music information included in the integrated music list 510, but the present disclosure is not limited thereto.

For example, the controller 180 may analyze data (e.g., the sentiment classification data) of the music list included in the integrated music list, and receive music information corresponding to the data from the connected external device and then allow the received music information to be included in the recommendation music list.

Alternatively, the controller 180 may compare the sound quality of the music information included in the integrated music list with the sound quality of the music information stored in the external device, and allow the music information stored in the external device to be included in the recommendation music list 650 when the sound quality of the music information stored in the external device is better than that of the music information included in the integrated music list.

Accordingly, when the mobile terminal is additionally connected to a new device capable of receiving music information, the user can receive recommendation music information for forming the integrated music list.

The recommendation music list 650 may be displayed on the display unit, and may be output together with the integrated music list 510. The controller 180 may add, to the integrated music list 510, music information selected based on a touch input applied to the music information included in the recommendation music list 650. In this case, music information overlapping with recommendation music information may be deleted from the integrated music list 510.

Figure 6A:
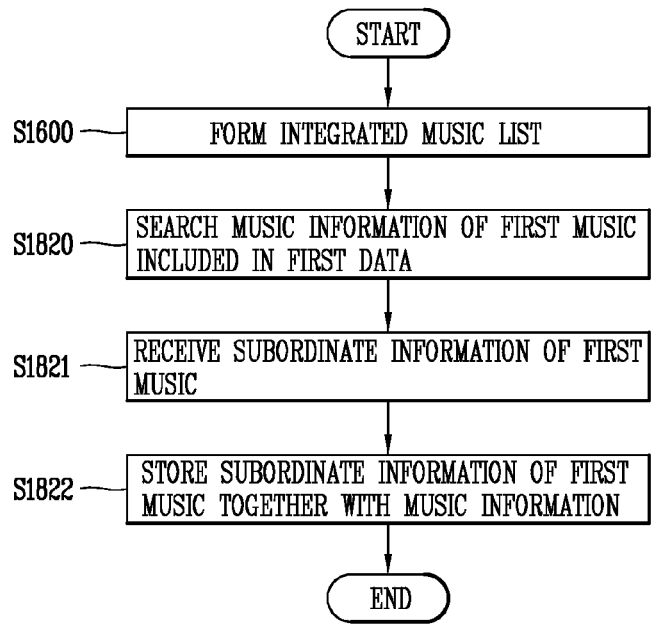
FIG. 6A is a flowchart illustrating a control method for storing subordinate information of music information in a playing apparatus.
Figure 6B:
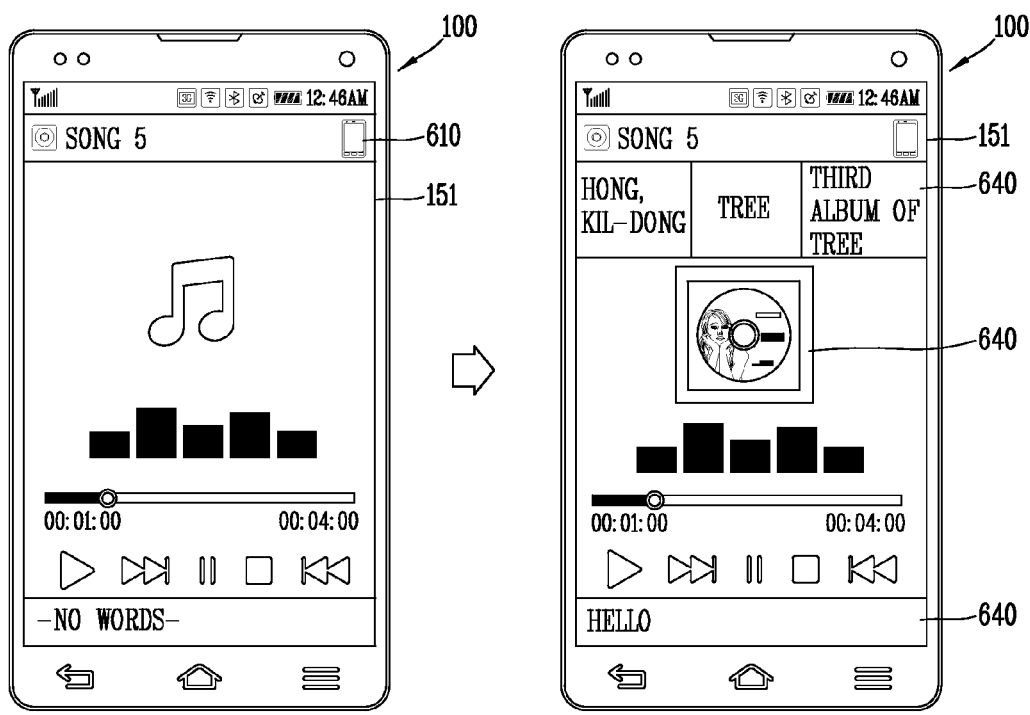
FIG. 6B is a conceptual view illustrating a control method of FIG. 6A.

FIG. 6A is a flowchart illustrating a control method for storing subordinate information of music information in a playing apparatus. FIG. 6B is a conceptual view illustrating a control method of FIG. 6A. The controller 180 forms the integrated music list (S1600), and searches music information of a first music included in the first data (S1820). The controller 180 receives subordinate information of a first music (S1821). Here, the subordinate information corresponds to the title of the first music, the words of the first music, the genre of the first music, the image of the first music, etc. The controller 180 searches, from the second data, the subordinate information of the first music, which is not included in the music information of the first music included in the first data, and controls the wireless communication unit to receive the subordinate information.

When the music information of the first music does not include the subordinate information, the display unit 151 cannot output visual information such as the words of the first music, an image corresponding to the first music, a singer of the first music and the title of the first music while the first music is being displayed.

The controller 180 controls the memory 160 to store the received subordinate information together with the music information (S1822). Referring to FIG. 6B, if the subordinate information 640 is stored together with the music information in the memory 160, the controller 180 controls the display unit 151 to output the subordinate information 640 while the first music is being played.

Since the controller 180 stores the received subordinate information in the memory 160, the subordinate information 640 can be output even though the wireless communication is interrupted.

Figure 7:
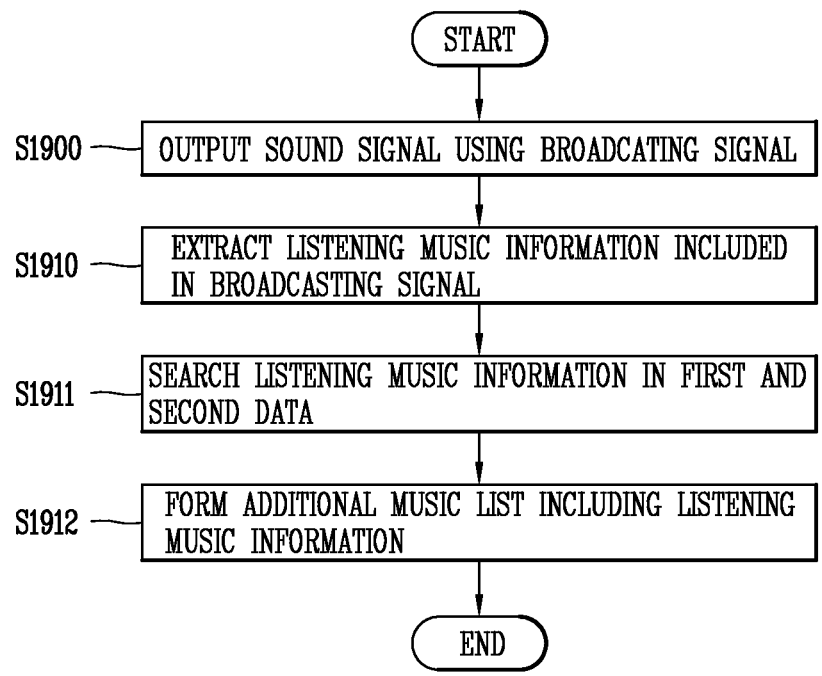
FIG. 7 is a flowchart illustrating a control method for adding, to an integrated music list, listening music included in a sound played by a broadcasting signal.

FIG. 7 is a flowchart illustrating a control method for adding, to the integrated music list, listening music included in a sound played by a broadcasting signal. The audio playing apparatus may output radio sound signal by receiving a broadcasting signal (S1900). That is, the user may listen to radio broadcasting based on a frequency using the audio playing apparatus.

The controller 180 extracts listening music information included in the broadcasting signal (S1910). For example, when a control command is input by the user while the user is listening to the radio broadcasting, the controller 180 senses listening music information. Alternatively, if music is included in the radio broadcasting, the controller 180 may automatically extract music information that the user is listening to. For example, the controller 180 may extract the music information by sensing a sound signal of the played music, or may extract information (the title of the music, the singer of the music, etc.) related to the music through a voice included in the sound signal.

The controller 180 searches the listening music information in the first and second data (S1911). The controller 180 forms an additional music list including the listening music information (S1912).

Accordingly, the user can personally receive music that the user has listened to during listening to broadcasting, using the audio playing apparatus. Further, the user can more easily form a music list without using any separate searching process.

Although it has been illustrated in the above that the audio playing apparatus is defined as the mobile terminal including the display unit 151, the present disclosure is not limited thereto. For example, the audio playing apparatus may be implemented as the headset 200 fixed to the user's head (and ears) to output a sound. In this case, the second data may be received by the service server 300, or may be stored in the memory of the mobile terminal 100 connected by wire or wireless to the headset 200. Hereinafter, a structure of the headset 200 according to an exemplary embodiment will be described.

FIGS. 8A to 8D are conceptual views illustrating a structure of the headset 200 according to an exemplary embodiment. The headset 200 includes first data including music information and an independent memory for storing at least one music list.

The headset 200 includes a fixing unit 210 fixed to the user's head, and first and second output units 220 and 230 mounted to both sides of the fixing part 210 to output sounds to both the user's ears. The first and second output units 220 and 230 respectively include first and second touch sensing units 221 and 231 for receiving touch inputs to control the playing of music.

Figure 8A:
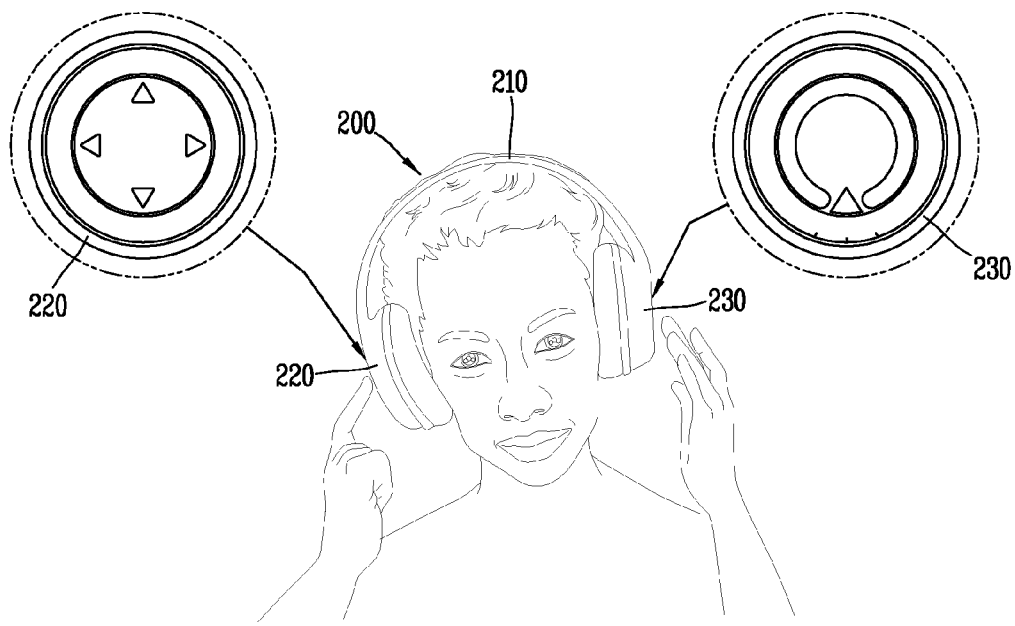
FIGS. 8A to 8D are conceptual views illustrating a structure of a headset according to an exemplary embodiment.
Figure 8B:
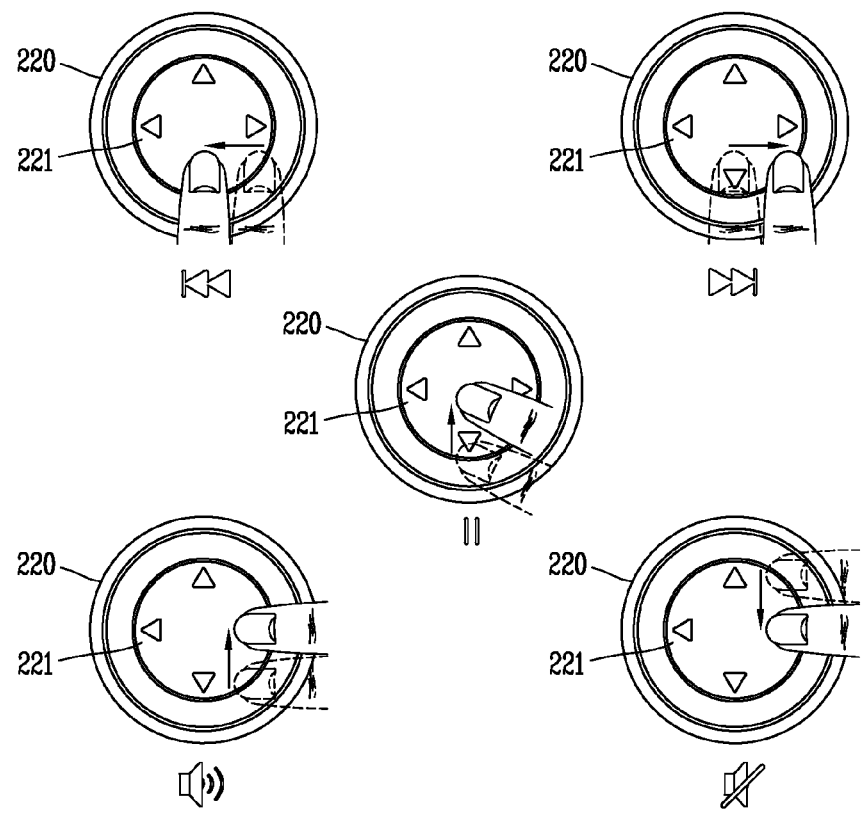

Referring to FIG. 8B, the first touch sensing unit 221 receives a touch input for controlling the playing state of music. Although an image for guiding the touch input to the first touch sensing unit 221 is illustrated in this figure, the first touch sensing unit 221 may not include the image described above.

The controller controls the playing state of music by sensing a continuous touch input applied to the first touch sensing unit 221. For example, if a touch input applied in a left direction from a right side of the first touch sensing unit 221 is received, the controller plays the music by moving backward. Alternatively, the controller may perform playing of a next or previous music among musics included in a music list, based on a touch input applied to both left and right areas of the first touch sensing unit 221.

The controller suspends or again performs the playing of the music based on a touch input vertically applied in a lower area of the first touch sensing unit 221. The controller may adjust a sound based on a touch input vertically applied in the first touch sensing unit 221.

Figure 8C:
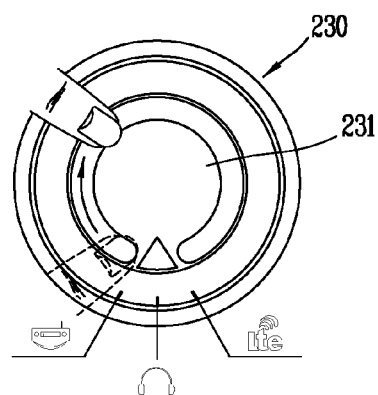

Referring to FIG. 8C, the controller may change the music list based to a touch input applied to the second touch sensing unit 231. For example, when a music list of first data, a music list of second data and a listening list of radio broadcasting are included, the controller may change a music list intended to be played by a touch input applied to the second touch sensing unit 231.

The music list changed by the touch input may include an integrated music list formed by the first and second data, and an additional music list including predetermined information. The number of music lists is not limited.

Although not specifically shown in this figure, the second touch sensing unit 231 for changing the music list may further include a toggle member. The user may change the music list by rotating the toggle member through pressurization.

Figure 8D:
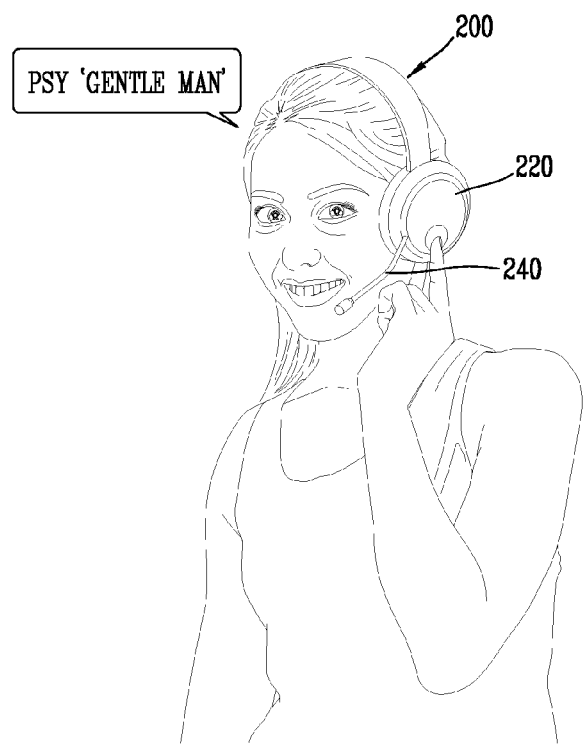

Referring to FIG. 8D, the headset 200 includes a microphone 240 for sensing a user's voice. The controller controls the headset 200 based on a voice applied through the microphone 240.

For example, when the microphone 240 senses a voice including the singer and title of music, the controller may search music information based on the voice and play the searched music information.

Figure 9A:
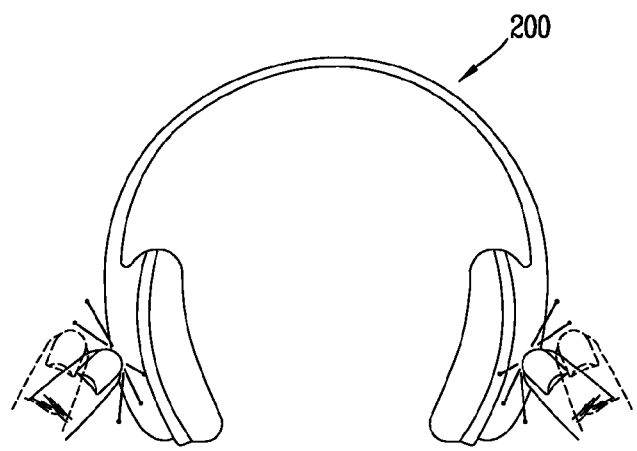
FIGS. 9A to 9C are conceptual views illustrating functions of the headset according to an exemplary embodiment.
Figure 9B:
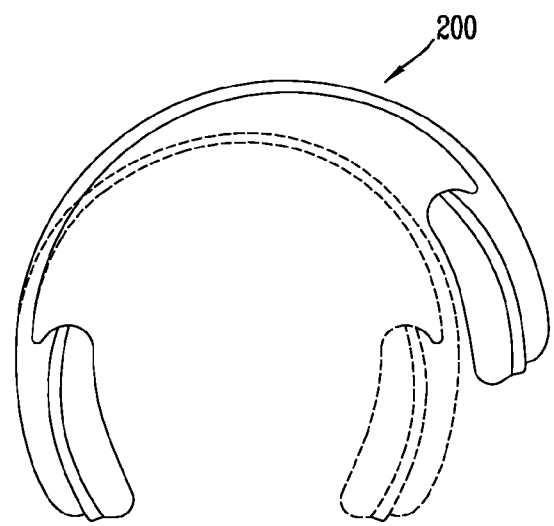
Figure 9C:
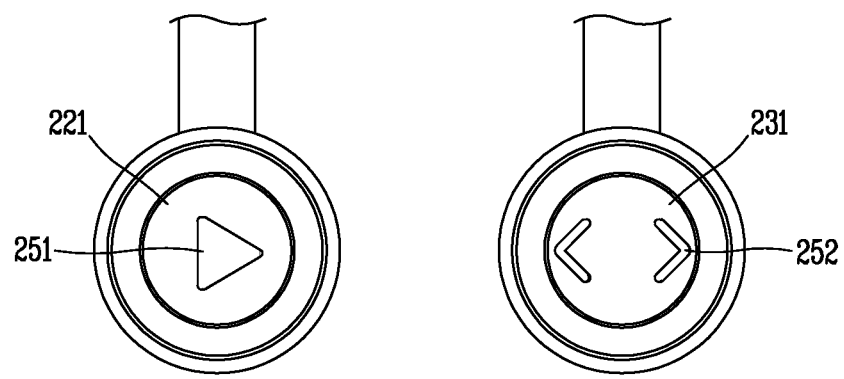

FIGS. 9A to 9C are conceptual views illustrating functions of the headset according to an exemplary embodiment.

Referring to FIG. 9A, the controller extracts music information by sensing vibration generated by a user's touch applied to the headset. If impact of a specific tempo is applied to the headset by the user, the controller extracts music formed with the specific tempo from the first and second data. The controller may form an integrated music list using at least one music extracted from the first and second data.

Accordingly, the user can easily search music formed with the specific tempo, or can more easily form a list including musics formed with the specific tempo.

A method for controlling the playing of music using deformation of the headset 200 will be described with reference to FIG. 9B. The controller may sense a state in which the first and second output units 220 and 230 are mounted to the user's ears or head. If it is sensed that any one of the first and second output units 220 and 230 is spaced apart from the user's ear (or head), the controller may suspend the playing of the music or change the state of the music into a mute state.

Accordingly, the user can suspend the output of music without any separate control in an emergency situation.

The structures of the first and second touch sensing units each having a tactile sensing unit formed therein will be described with reference to FIG. 9C. As the music is played, the controller of the headset outputs first and second tactile sensing units 251 and 252 to the respective first and second touch sensing units 221 and 231. The first and second tactile sensing units 251 and 252 are formed to be embossed so that the user can perform tactile sensing the first and second tactile sensing units 251 and 252. For example, the first tactile sensing unit 251 may be protruded in a shape for inputting a playing command, and the second tactile sensing unit 252 may be protruded in an arrow shape for playing a next or previous music. However, the shapes of the first and second tactile sensing units 251 and 252 are not limited thereto.

Figure 10A:
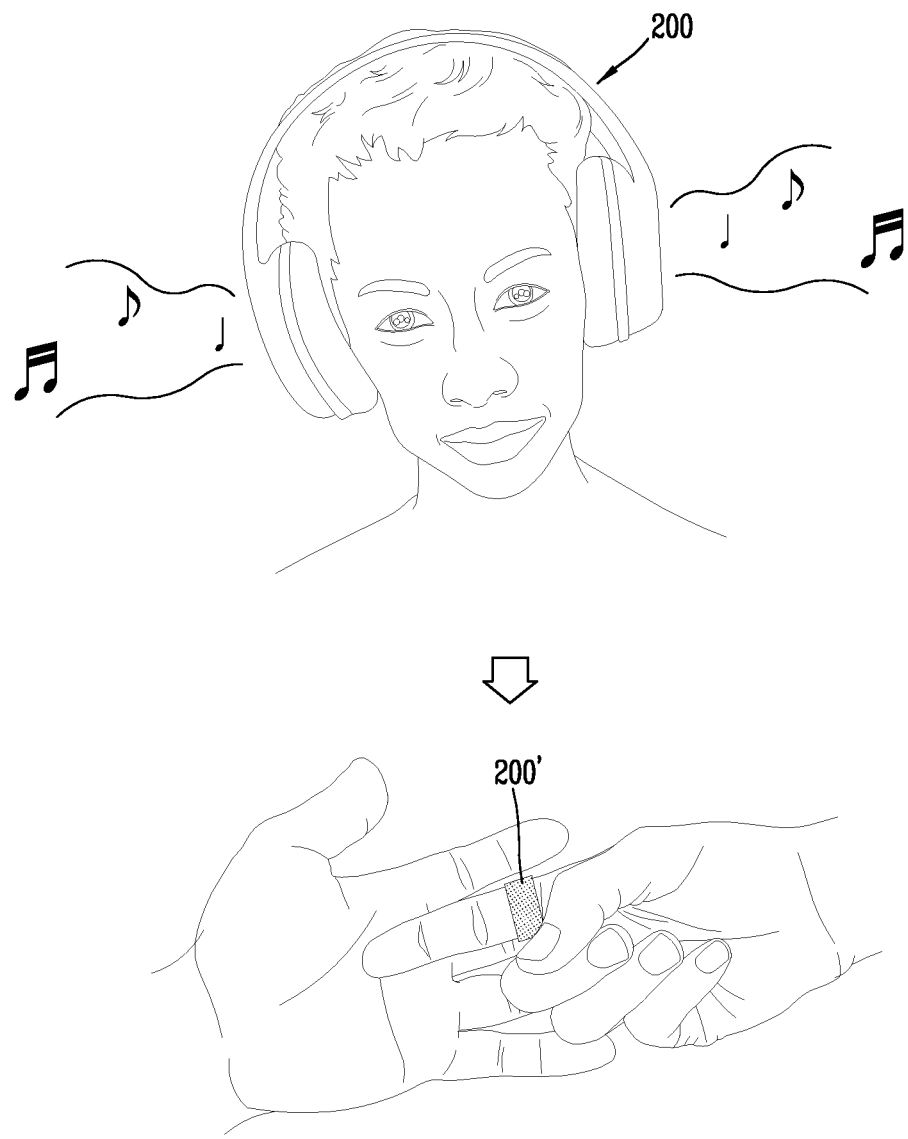
FIGS. 10A to 10C are conceptual views illustrating a function of an audio playing apparatus, in which information on music is input to the audio playing apparatus.
Figure 10B:
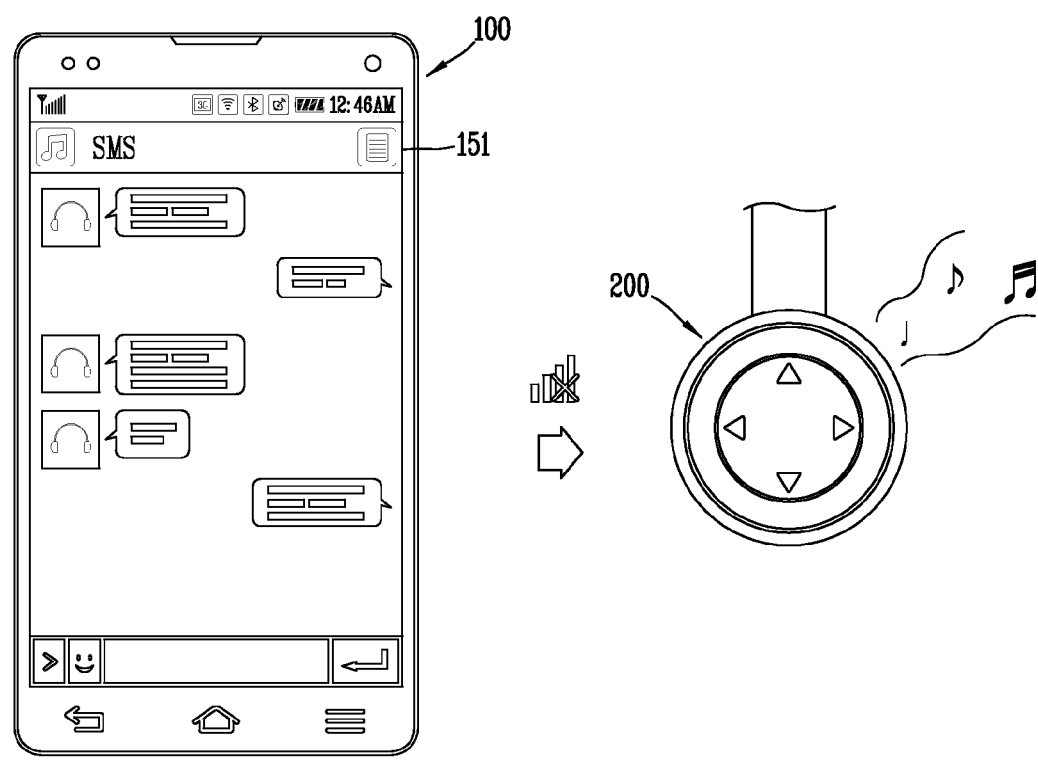
Figure 10C:
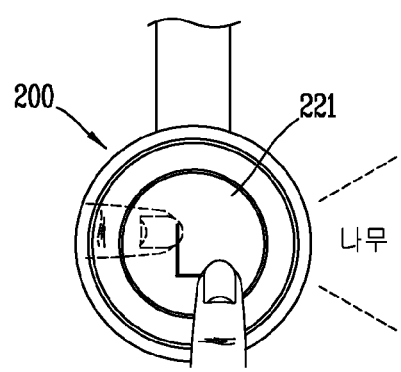

FIGS. 10A to 10C are conceptual views illustrating a function of an audio playing apparatus, in which information on music is input to the audio playing apparatus.

Referring to FIG. 10A, the headset 200 is formed to perform wireless communication with an external input device 200'. The external input device 200' may be formed in a ring shape to be mounted to a user's finger, but the present disclosure is not limited thereto. The external input device 200' mounted to the finger may sense movement of the finger.

For example, when a virtual character is written by moving the finger to which the external input device is mounted, the external input device senses the character by analyzing the movement of the finger. The headset 200 receives information on the character, and searches an appropriate music using the character. The controller may control the headset 200 to output music including information most similar to the character.

An application for transmitting information to the headset 200 is installed in the mobile terminal 100 according to FIG. 10B. The headset 200 has a unique communication ID, and may communicate with the mobile terminal 100 through the application. That is, the headset 200 may transmit and receive data with the mobile terminal 100 using the unique communication ID.

If the application of the mobile terminal 100 is executed, the controller may output data received from the headset 200, or may transmit data input by the user to the headset 200.

For example, if a text related to a specific music is input to the mobile terminal 100 by the user, the controller of the mobile terminal 100 transmit a playing command of specific music to the headset 200 through the application. The headset 200 searches and plays the specific music based on the playing command. The controller may receive a response text that the specific music is played, and output the received response text to the display unit 151 of the mobile terminal 100.

Accordingly, the headset 200 can be controlled using the mobile terminal 100 even when the headset 200 and the mobile terminal 100 are not connected by wireless to each other.

A control method for searching music using the touch sensing unit 221 will be described with reference to FIG. 10C. The memory of the headset 200 may store at least one music and an integrated music list.

The touch sensing unit 221 recognizes, as a character, a user's touch input continuously applied thereto. The controller of the headset 200 may search music information based on the character recognized by the touch input. That is, if the user writes a character on the touch sensing unit 221, the controller may search music information on the character, and play music based on the searched music information.

That is, the touch sensing unit 221 may not only receive a control command for controlling the headset 200 but also sense a character-type control command input by the user.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An audio playing apparatus, comprising:
    a speaker;
    a memory configured to store first data including at least one music information;
    a wireless communication unit capable of receiving, from an exterior, second data including at least one music information;
    a controller capable of forming an integrated music list using the first and second data; and
    a display unit capable of displaying the integrated music list including a plurality of music information bars corresponding to plurality of music included in the first or second data;
    wherein the controller is capable of:
    comparing a plurality of music information constituting the first and second data;
    extracting overlapping music information included in the first and second data; and
    selecting one music information from the pair of overlapping music information, and
    wherein the controller is further configured to: play, via the speaker, a second music included in the second data;
    display a first displaying bar overlapped with one portion of one music information bar corresponding to the second music;
    extend the first displaying bar as time to play the second music elapses;
    search music information similar to the second music in the first data when wireless communication connection to the exterior is limited while the second music included in the second data is being played;
    stop extending the first displaying bar when a playing of the second music is stopped due to interruption of wireless communication;
    display an additional music information bar corresponding to the searched music information;
    play, via the speaker, a searched music based on the searched music information when the playing of the second music is stopped;
    display a second displaying bar overlapped with one portion of the additional music information bar on a position corresponding to a point where the first displaying bar stops extending; and
    extend the second displaying bar from the position while the searched music is played via the speaker,
    wherein the first displaying bar and the second displaying bar are displayed together,
    wherein the first displaying bar does not extend while the searched music is played via the speaker, and
    wherein music information includes a music playing file played via the speaker.

2. The audio playing apparatus of claim 1, wherein the controller searches music information matched to a first music in the second data, when a playing sound quality of the first music in the integrated music list is lower than a predetermined reference sound quality.

3. The audio playing apparatus of claim 1, wherein, when music information matched to a first music does not exist in the second data, the controller extracts, from the second data, a similar music including music information similar to the first music.

4. The audio playing apparatus of claim 2, wherein the controller controls the wireless communication unit to receive subordinate information related to the first music, and
    wherein the controller controls the memory to store the received subordinate information together with the first music.

5. The audio playing apparatus of claim 1, wherein the controller compares a predetermined reference sound quality with the playing sound quality of music included in the music information constituting the first data.

6. The audio playing apparatus of claim 1, wherein, when a similar music included in the similar music information is the same music as the second music, the controller plays the similar music from a playing time of the similar music, corresponding to the suspension time of the second music.

7. The audio playing apparatus of claim 1, wherein, when a similar music included in the similar music information is different from the second music, the controller suspends the playing of the second music and plays the similar music from the beginning.

8. The audio playing apparatus of claim 1, wherein the display unit outputs a pop-up window including information on that the playing of music being played is limited when the wireless communication connection is limited.

9. The audio playing apparatus of claim 1, wherein the display unit displays a source image of each music information representing the first or second data.

10. The audio playing apparatus of claim 1, wherein the first and second data further include subordinate information related to each music,
    wherein the controller controls the wireless communication unit to receive additional music information based on the subordinate information, and
    wherein the controller forms music information extracted from the first and second data based on the subordinate information and an additional music list including the extracted music information.

11. The audio playing apparatus of claim 1, wherein the speaker is configured to output a sound based on a digital signal received from the wireless communication unit,
    wherein the controller analyzes music information included in the sound, and
    wherein the controller forms an additional music list by extracting the overlapping listening music information from the first and second data.

* * * * *